United States Patent
Carreno et al.

(10) Patent No.: US 12,072,672 B2
(45) Date of Patent: Aug. 27, 2024

(54) HOROLOGY DEVICE COMPRISING A FIRST COMPONENT FIXED TO A SECOND COMPONENT BY PLASTIC DEFORMATION

(71) Applicant: ROLEX SA, Geneva (CH)

(72) Inventors: William Carreno, Geneva (CH); Aurélien Dumas, Nidau (CH)

(73) Assignee: ROLEX SA, Geneva (CH)

( * ) Notice: Subject to any disclaimer, the term of this patent is extended or adjusted under 35 U.S.C. 154(b) by 114 days.

(21) Appl. No.: 16/881,299

(22) Filed: May 22, 2020

(65) Prior Publication Data

US 2020/0371476 A1 Nov. 26, 2020

(30) Foreign Application Priority Data

May 23, 2019 (EP) ..................... 19176099

(51) Int. Cl.
*G04B 13/02* (2006.01)
*F16B 11/00* (2006.01)

(52) U.S. Cl.
CPC ............ *G04B 13/02* (2013.01); *F16B 11/002* (2013.01)

(58) Field of Classification Search
CPC .... G04B 13/02; G04B 13/021; G04B 19/044; F16B 11/002
USPC ........................................................ 368/322
See application file for complete search history.

(56) References Cited

U.S. PATENT DOCUMENTS

2013/0309446 A1* 11/2013 Conus .................. G04D 1/0042 428/137

FOREIGN PATENT DOCUMENTS

| CH | 699 680 | A2 | 4/2010 | | |
|---|---|---|---|---|---|
| CH | 699680 | B1 * | 9/2014 | .......... | G04B 13/022 |
| CH | 711923 | A2 * | 6/2017 | ................ | F16B 4/00 |
| EP | 2 469 356 | A1 | 6/2012 | | |
| EP | 3070345 | A1 * | 9/2016 | .............. | B21J 15/50 |
| EP | 3258325 | A1 * | 12/2017 | ............... | G04B 1/16 |
| JP | 2010-539440 | A | 12/2010 | | |
| JP | 2014-501922 | A | 1/2014 | | |
| JP | 2018-524599 | A | 8/2018 | | |
| JP | 2018-151288 | A | 9/2018 | | |
| WO | 2008/132135 | A2 | 11/2008 | | |
| WO | 2012/084383 | A2 | 6/2012 | | |
| WO | 2013/064390 | A1 | 5/2013 | | |
| WO | 2017/016950 | A1 | 2/2017 | | |

OTHER PUBLICATIONS

European Search Report dated Jan. 8, 2020, issued in counterpart European Patent Application No. 19176099.0 (8 pages).
Office Action dated May 14, 2024, issued in counterpart JP application No. 2020-087830, with English translation. (16 pages).

* cited by examiner

*Primary Examiner* — Edwin A. Leon
*Assistant Examiner* — Kevin Andrew Johnston
(74) *Attorney, Agent, or Firm* — WHDA, LLP (57) ABSTRACT

A horology device that includes a first component having at least one plastically deformable portion, and a second component provided with a surface, notably a surface of revolution and/or of guidance and/or of attachment of the first component relative to the second component, the first component being fixed permanently to the second component by plastic deformation of the at least one portion against the second component, in a plane perpendicular or substantially perpendicular to an axis of said surface of the second component.

22 Claims, 5 Drawing Sheets

HOROLOGY DEVICE COMPRISING A FIRST COMPONENT FIXED TO A SECOND COMPONENT BY PLASTIC DEFORMATION

This application claims priority of European patent application No. EP19176099.0 filed on May 23, 2019, the contents of which is hereby incorporated by reference herein in its entirety.

The invention relates to a horology device comprising two components fixed to one another. The invention also relates to a method for producing such a horology device. The invention also relates to a horology movement comprising such a horology device. The invention finally relates to a timepiece comprising such a horology device or such a horology movement.

Various alternative forms of oscillator respectively adopting the form of a balance wheel/hairspring combination are known from patent application WO2013064390A1. In each of these embodiments, the elements that make up the oscillator are driven onto a balance staff. In one particular embodiment variant, a balance wheel plate jackets the balance staff over practically the entirety of the height thereof, leaving only the pivots provided at each of the ends of the staff visible. While such a design is advantageous with regard to the simplicity of the geometry of the balance staff, the main body of which in this instance takes the form of a smooth cylinder, it is not optimal in so far as the forces induced by the driving of the plate could prove excessive for the balance staff, particularly if these forces are intended to be absorbed by a balance staff pivot the dimensions of which are very appreciably smaller than those of the body of the balance staff.

It is an object of the invention to provide an alternative horology device to the horology devices known from the prior art and to improve the horology devices known from the prior art. In particular, the invention proposes a horology device that makes it possible to avoid applying excessive driving-on forces. The present invention also relates to a method for producing such a horology device.

According to the invention, a horology device is defined by claims 1 and 13.

Various embodiments of the horology device are defined by claims 2 to 10.

According to the invention, a method for producing a horology device is defined by claim 11.

One embodiment of the method is defined by claim 12.

According to the invention, a horology movement is defined by claim 14.

According to the invention, a timepiece is defined by claim 15.

The attached figures depict, by way of example, three embodiments of a timepiece according to the invention.

A first embodiment of a timepiece 100 is described hereinafter with reference to FIGS. 1 to 4. The timepiece may be a watch, particularly a wristwatch.

Figure 1:
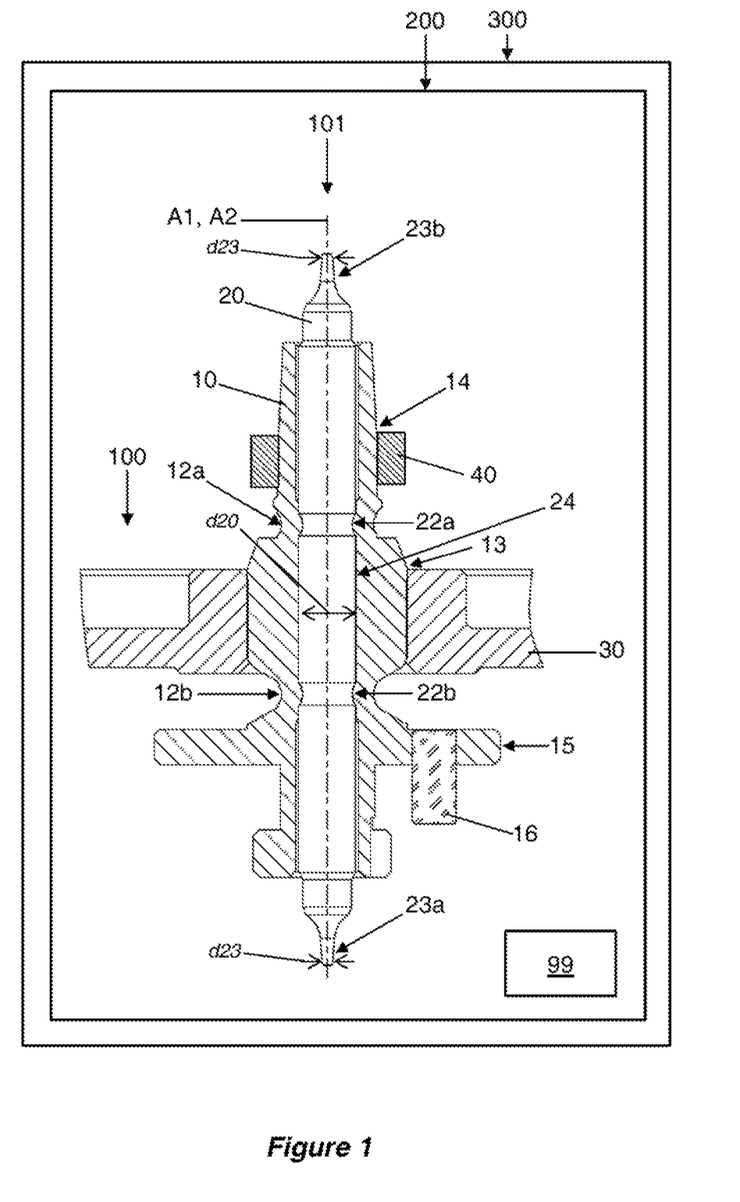
FIG. 1 is a schematic view in longitudinal section of a first embodiment of a timepiece comprising a first embodiment of a horology device.

The timepiece comprises a horology movement 200. As a preference, this horology movement is a mechanical movement, particularly an automatic movement.

The horology movement 200 comprises a horology device 100 mounted with the ability to rotate relative to a frame 99 of the movement.

The horology device 100 comprises:
- a first component 10 comprising at least one plastically deformable portion 12a, 12b, and
- a second component 20 provided with a surface 24, notably a surface of revolution and/or of guidance and/or of attachment of the first component relative to the second component.

The first component is fixed permanently to the second component by plastic deformation of the at least one portion 12a, 12b against the second component, in a plane perpendicular or substantially perpendicular to an axis A2 of said surface 24 of the second component.

As a preference, the second component 20 is also provided with an element 23a, 23b for guidance and/or attachment of the horology device 100 relative to the horology movement, particularly relative to the frame 99 of the horology movement.

In this first embodiment, the horology device 100 is a balance wheel 100 of an oscillator 101 of the balance wheel/hairspring type. The oscillator comprises the balance wheel and a hairspring 40. The balance wheel is therefore mounted with the ability to rotate in bearings added into the frame 99 of the horology movement.

What is meant here by a "balance wheel" is a balance wheel assembly, namely an assembly comprising at least one flywheel 30 and a balance staff 20.

The balance wheel or balance wheel assembly here comprises a first component in the form of a plate 10 and a second component in the form of a balance staff 20.

The balance staff 20 has, as its geometric axis, the axis A2. This axis A2 is the axis of revolution of the balance staff, notably of the surface 24 of the balance staff 20.

The balance wheel or balance wheel assembly here has the particular feature of comprising the plate 10 which is fixed to the balance staff 20 not by being driven onto it as known from the prior art, but by setting, namely by plastic deformation of the at least one portion 12a, 12b of the plate 10 against the balance staff 20, in a plane perpendicular or substantially perpendicular to the balance staff 20, particularly to the axis A2 of revolution of the balance staff 20, notably the surface 24 of the balance staff 20.

The balance wheel 100 comprises a plate 10 which jackets or covers the balance staff 20 over almost the entirety of its height. For example, the plate 10 covers the staff 20 over the entire length thereof with the exception of the pivots, and possibly with the exception of the pivot-shanks. Alternatively, the plate may jacket or cover a smaller portion of the staff. As a preference, the plate jackets or covers a portion representing at least 50%, or even at least 70% of the total length of the staff 20.

Figure 2:
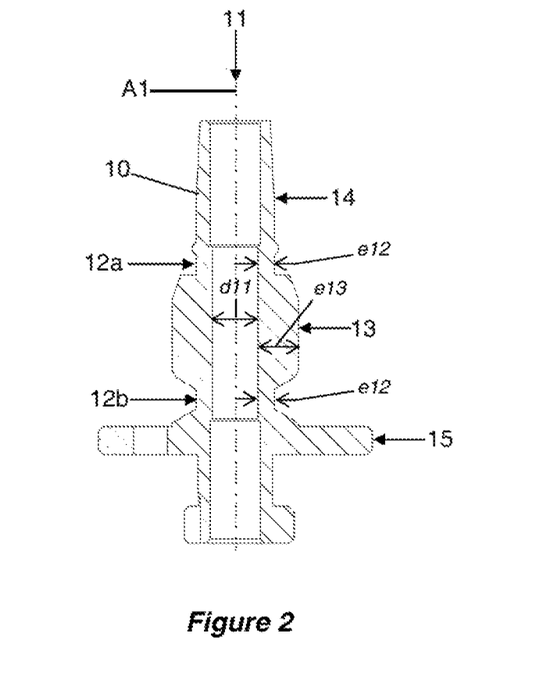
FIG. 2 is a view in longitudinal section of a first component of the first embodiment of the horology device.

The plate 10 has a tubular structure comprising a through-opening 11 of axis A1 within which the balance staff 20 is intended to be housed. This plate 10 further comprises at least one portion 12a, 12b of lower mechanical strength which is able to be deformed plastically using a suitable tool, for example pliers. FIG. 2 illustrates the plate before its plastic deformation that allows it to be fixed to the staff 20.

Once the plate 10 has been assembled, notably fixed, on the balance staff 20, the axis A1 is parallel to the axis A2 and in particular coincident with the axis A2.

The plate 10 may also comprise a portion 13 for accepting the flywheel 30.

The plate 10 may also comprise a portion 14 for accepting a collet 40 of a hairspring (not depicted).

The plate 10 may also comprise a portion 15 taking the form of a disk comprising a pin 16.

As a preference, the flywheel 30 is assembled onto the receiving portion 13 by driving it on.

As a preference, the collet 40 is assembled on the receiving portion 14 by driving it on.

As a preference also, the portion 15 may be formed as one piece with the plate 10, which means to say that the plate and the portion 15 are monobloc. Alternatively, the portion 15 could be added to the plate, for example by being driven on.

The wall thickness e12 of the plate 10 at the at least one portion 12a, 12b is substantially less than that of the wall thickness e13 at the receiving portion 13. In particular:

e12<e13/2;

and/or e12<0.2 mm, or even e12<0.15 mm, or even e12<0.12 mm.

Preferably, the plate 10 comprises two portions 12a, 12b of lower mechanical strength, which are positioned one on each side of the portion 13 for accepting the flywheel 30 along the axis A1.

All or part of these portions 12a, 12b is able to be plastically deformed against the staff 20, in a plane perpendicular or substantially perpendicular to the axis A1 or to the axis A2.

Each of the portions 12a, 12b may, for example, be deformed plastically at isolated points. More specifically, the portion 12a, 12b may comprise, in the opening 11, projections or bosses brought about by localized plastic deformations of the material of which the portion 12a, 12b is made about the axis A1 or the axis A2.

Preferably, the material of the portion 12a, 12b can be plastically deformed over the entirety of the surface of the portion 12a, 12b, notably over the entirety of the surface of revolution of the portion 12a, 12b. In other words, the portion 12a, 12b may experience annular setting, which allows the portion 12a, 12b to be plastically deformed over 360 degrees about the axis A1 or the axis A2, as depicted in FIG. 3.

The wall thicknesses e12 of the portions 12a, 12b may be identical. Alternatively, the wall thicknesses e12 of the portions 12a, 12b may be different.

Preferably, the staff 20, particularly the surface 24, may comprise a receiving portion 22a, 22b positioned at the level of the portion 12a, 12b when the staff is inserted in the opening 11 in the plate, in which portion the material deformed plastically in the region of the portion 12a, 12b can become housed. The portion 22a, 22b may, for example, take the form of a groove extending over 360° about the axis A2, notably when the portion 12a, 12b is plastically deformed over 360 degrees about the axis A1 or A2. Alternatively, the portion 22a, 22b may extend over an angle smaller than 360°. Each portion 22a, 22b may comprise several parts, notably four parts, evenly or unevenly distributed about the axis A2.

Figure 3:
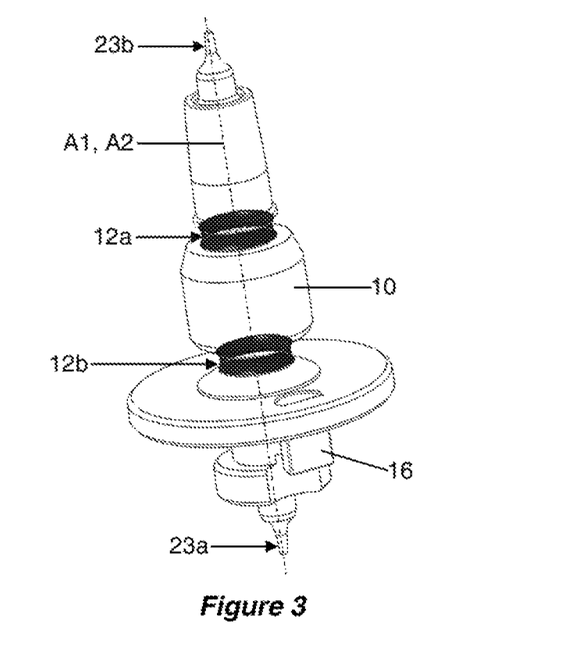
FIG. 3 is a perspective view of the first embodiment of the horology device.

This groove may have a U-shaped cross section as depicted in FIGS. 1 and 3. Alternatively, it may have a V-shaped cross section, or a square wave or rectangular shaped cross section.

Advantageously, the plastic deformation or deformations of one or more portions 12a, 12b allow the plate 10 a torque resistance on the staff 20 which is greater than 3 mN·m, or even greater than 5 mN·m. Advantageously, the torque resistance of the plate 10 on the staff 20 is enough to allow the plate 10 to be permanently fixed on the staff 20 to which a flywheel 30 with an inertia greater than 5 mg·cm², or even greater than 10 mg·cm², is attached.

Advantageously, the material of the staff 20 is chosen so that the latter is able to extend the compression force brought about by the pliers during the step of plastic deformation of a portion 12a, 12b of the plate 10. More particularly, the material of the staff 20 is chosen so that the step of plastically deforming a portion 12 of the plate 10 does not invalidate the geometric integrity of said staff.

Advantageously, the material of the plate 10, notably of the at least one zone 12a, 12b, is chosen so that it can be plastically deformed. Preferably, the material of the plate 10 is a copper-containing alloy, such as a CuBe2 alloy or a CuNiSn alloy such as a CuNi15Sn8 or "ToughMet" alloy. Such an alloy has the advantage of exhibiting excellent deformability. Its hardness may be of the order of 250 Hv, and range up to as much as 400 Hv after heat treatment.

Preferably, the Vickers hardness of the material chosen for the plate 10 is 2 to 6 times lower than that of the material chosen from the staff 20.

The guidance and/or fixing element 23a, 23b preferably comprises pivots 23a, 23b, notably pivots having a geometry of revolution of axis A2. These pivots preferably collaborate with bearings provided in the frame of the horology movement to guide the horology device with respect to the frame of the movement relative to the axis A2.

Figure 5:
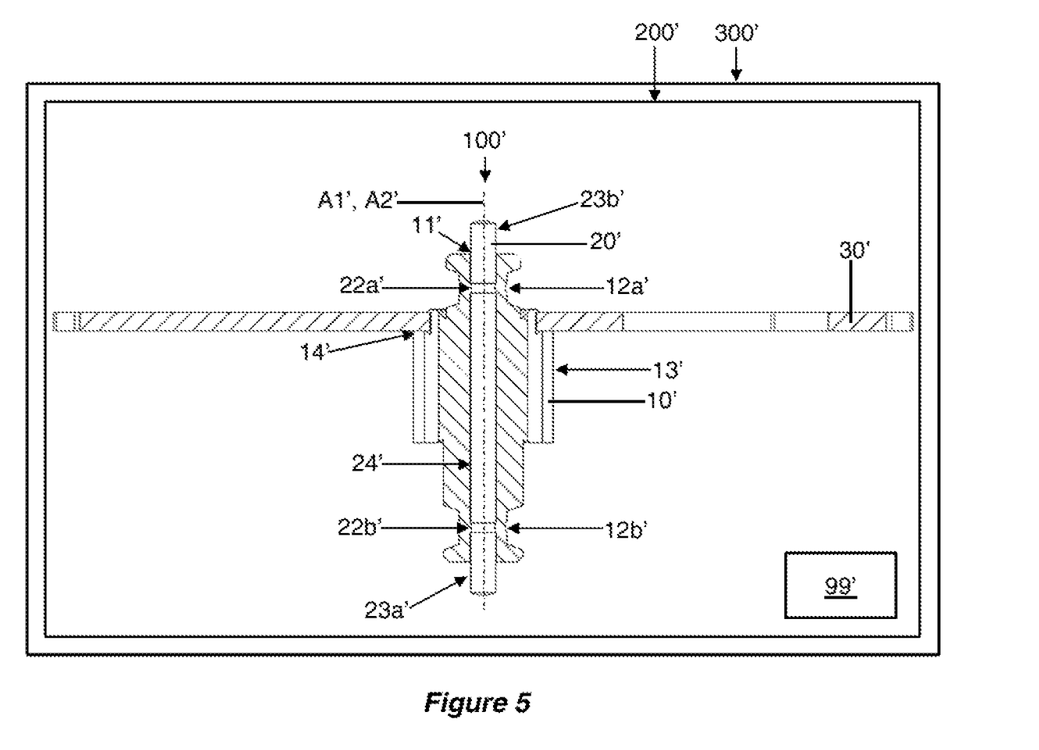
FIG. 5 is a schematic view in longitudinal section of a second embodiment of a timepiece comprising a second embodiment of a horology device.

A second embodiment of a timepiece 100' is described hereinafter with reference to FIG. 5. The timepiece may be a watch, particularly a wristwatch.

The timepiece comprises a horology movement 200'. The horology movement is an electronic movement or a mechanical movement, particularly an automatic movement.

The horology movement 200' comprises a horology device 100' mounted with the ability to rotate relative to a frame 99' of the movement.

The horology device 100' comprises:

a first component 10' comprising at least one plastically deformable portion 12a', 12b', and a second component 20' provided with a surface 24', notably a surface of revolution and/or of guidance and/or of attachment of the first component relative to the second component.

The first component is fixed permanently to the second component by plastic deformation of the at least one portion against the second component, in a plane perpendicular or substantially perpendicular to an axis A2' of said surface 24' of the second component.

As a preference, the second component 20' is also provided with an element 23a', 23b' for guidance and/or attachment of the horology device relative to the horology movement, particularly relative to the frame of the horology movement.

In this second embodiment, the horology device is a toothed disk 100', for example a third-wheel disk 100' of a geartrain of the horoogy movement.

The overall structure of the horology device remains the same as that described hereinabove for the first embodiment.

The disk 100' comprises, by way of first component, a pinion 10' which jackets or covers the second component 20'. The second component is a pivot staff 20'. The pinion 10' jackets the pivot staff 20' over almost the entirety of its height. The staff 20' is chiefly cylindrical and smooth. In this instance, the axis A2' is an axis of revolution of the second component.

In this second embodiment, the pinion 10' comprises an axis A1', and two portions 12a', 12b' of lower mechanical strength, which are arranged one on each side of a toothed portion 13' along the axis A1'.

As a preference, the pinion 10' comprises a receiving portion 14' for accepting a third-wheel 30'.

Advantageously, the plastic deformation or deformations of a portion 12a', 12b' allow the pinion 10' a torque resistance on the staff 20' which is enough to allow the transmission of torque between the pinion 10' and the staff 20', and therefore to allow the transmission of torque between the wheel 30' and the staff 20'.

Advantageously, the plastic deformation or deformations of a portion 12a', 12b' allow a torque resistance of the pinion 10' on the staff 20' which is higher than 3 mN·m or even higher than 5 mN·m.

Preferably, the staff 20', particularly the surface 24', may comprise a receiving portion 22a', 22b' positioned at the portion 12a', 12b' when the staff is inserted into an opening 11' of the first component, into which portion the material plastically deformed at the portion 12a', 12b' can be received.

The material of the pinion 10' may be a steel, for example a lead-free steel such as a Finemac steel. The hardness of material of the pinion, after heat treatment, is of the order of 500 to 700 Hv. The heat treatment of the pinion may take place once the pinion 10' has been assembled onto the staff 20'. In that case, the material of the staff 20' is chosen so that it can withstand the heat treatment of the pinion 10'. More specifically, the material of the staff 20' is chosen so that the step of heat treating the pinion 10' does not invalidate either the properties or the geometric integrity of said staff.

The guidance and/or fixing element 23a', 23b' preferably comprises pivots 23a', 23b', notably pivots having a geometry of revolution of axis A2'. These pivots preferably collaborate with bearings provided in the frame of the horology movement to guide the horology device with respect to the frame of the movement relative to the axis A2'.

Figure 6:
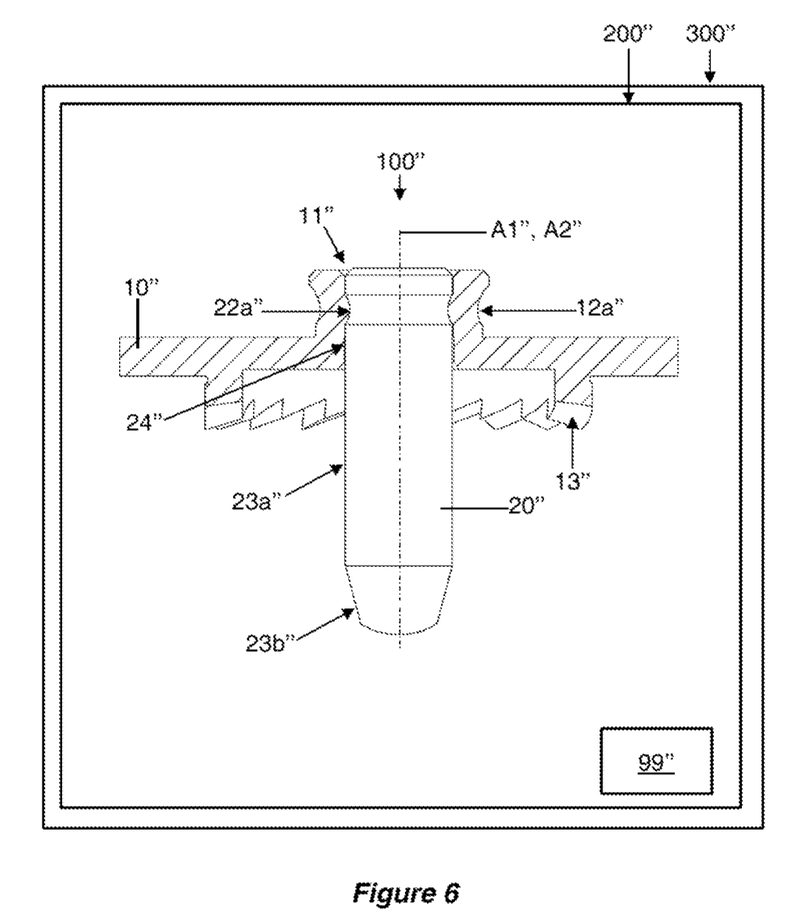
FIG. 6 is a schematic view in longitudinal section of a third embodiment of a timepiece comprising a third embodiment of a horology device.

A third embodiment of a timepiece 100" is described hereinafter with reference to FIG. 6. The timepiece may be a watch, particularly a wristwatch.

The timepiece comprises a horology movement 200". The horology movement is an electronic movement or a mechanical movement, particularly an automatic movement.

The horology movement 200" comprises a horology device 100" mounted with the ability to rotate and translate relative to a frame 99" of the movement.

The horology device 100" comprises:
a first component 10" comprising at least one plastically deformable portion 12a", and
a second component 20" provided with a surface 24", notably a surface of revolution and/or of guidance and/or of attachment of the first component relative to the second component.

The first component is fixed permanently to the second component by plastic deformation of the at least one portion against the second component, in a plane perpendicular or substantially perpendicular to an axis A2" of said surface 24" of the second component.

As a preference, the second component 20" is also provided with an element 23a", 23b" for guidance and/or attachment of the horology device relative to the horology movement, particularly relative to the frame of the horology movement.

In this second embodiment, the horology device is a vertical clutch disk 100", for example a toothed vertical clutch disk 100".

The overall structure of the horology device remains the same as that described hereinabove in respect of the first and second embodiments.

The disk 100" comprises, by way of first component, a wheel 10" which partially jackets the second component 20". The wheel 10" may, for example, comprise edge teeth 13". The second component is a staff 20" allowing pivoting and translational movement. The staff 20" is chiefly cylindrical and smooth. The staff 20", particularly the guidance and/or attachment element, preferably comprises a body 23a" designed to be guided, notably to pivot, in a bearing belonging to the frame 99", and an end 23b" acting as pivot and collaborating with a cam or with a movement stem 200", to guide the staff 20" in rotation and in translation relative to the respective axes A1" and A2" of the wheel 10" and of the staff 20".

In this third embodiment, the wheel 10" comprises a single portion 12a" of lower mechanical strength which is, for example, positioned at one end of the wheel 10" along the axis A1". The staff 20", particularly the surface 24", may comprise a receiving portion 22a" positioned level with the portion 12a" when the staff 20" is inserted into an opening 11" in the wheel 10", and in which the plastically deformed material can become housed.

One embodiment of a method for producing a horology device 100, 100', 100" as mentioned hereinabove is described hereinafter, with more particular application to the first embodiment. This method is similarly applicable to creating the second and third embodiments of the horology device.

Figure 4:
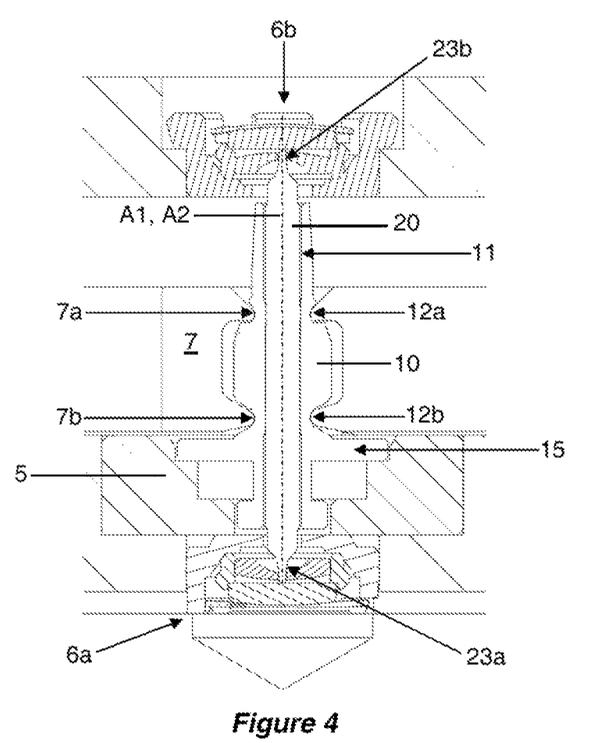
FIG. 4 is a view in longitudinal section of the first embodiment of the horology device, the device being placed in a fitting, during its production method, particularly during the plastic deformation of the first component.

The method comprises the following steps:
a step of supplying the first component 10, 10', 10" comprising at least the plastically deformable portion 12a, 12b; 12a', 12b'; 12a", particularly a step of supplying the first component positioned beforehand and held in a fitting 5, particularly via the portion 15 which is guided and kept in abutment within the fitting 5, as illustrated in FIG. 4 (as far as the first embodiment is concerned),
a step of supplying the second component 20, 20', 20" provided with a surface 24; 24'; 24", notably with a surface of revolution and/or with a surface of guidance and/or of attachment of the first component relative to the second component, and preferably with an element 23a, 23b; 23a', 23b'; 23a", 23b" for guidance and/or attachment of the horology device relative to the movement,
a step of positioning the first component relative to the second component. In this step, the second component is inserted for example in the through-opening 11; 11'; 11" of the first component until a first pivot 23a is positioned in abutment against a first bearing 6a that reproduces a bearing of a horology movement, notably a bearing of a plate of a horology movement. The diameters d11 of the opening of the first component and d20 of the main body or of the surface 24; 24'; 24" of the second component are chosen to be such that the radial clearance between the first component and the second component allows centering within the required tolerances, notably for a balance wheel and a hairspring, notably with reference to the pivots 23*a*, 23*b* (as far as the first embodiment is concerned), a step of fixing the first component to the second component by plastic deformation of the at least one portion 12*a*, 12*b*; 12*a*', 12*b*'; 12*a*" of the first component against the second component, in a plane perpendicular or substantially perpendicular to the axis A2, A2', A2" of said surface 24; 24'; 24" of the second component.

Advantageously, during the positioning step, use is made of a second bearing 6*b* reproducing a bearing of a horology movement, notably a bearing of a bridge of the horology movement, facing a second pivot 23*b*. In this configuration, the regions 12*a*, 12*b* are sited respectively facing the regions 22*a*, 22*b* (which are not visible in FIG. 4) of the staff 20, give or take the axial clearance.

Advantageously, the fixing step involves the use of at least one set of pliers to plastically deform the at least one plastically deformable portion. Alternatively or in addition, the fixing step may involve the simultaneous deformation of several deformable portions. Alternatively, the operations of squeezing the various zones may succeed one another. More generally, the deformation can be carried out by applying mechanical actions or forces perpendicularly to the axis A1, A2.

Deformation can be achieved by squeezing the zones 12*a*, 12*b*; 12*a*', 12*b*'; 12*a*" against the zones 22*a*, 22*b*; 22*a*', 22*b*'; 22*a*" using a tool 7 having at least one pair of pliers jaws 7*a*, 7*b*.

Optionally, the method may comprise a step of heat treating the first component after the fixing step.

At the end of the steps mentioned hereinabove, the zones 12*a*, 12*b*; 12*a*', 12*b*'; 12*a*" of the first component are respectively in contact with the zones 22*a*, 22*b*; 22*a*', 22*b*' 22*a*" of the second component. In the case of the first embodiment, that introduces a torque resistance of the plate 10 on the staff 20 greater than 3 mN·m, or even greater than 5 mN·m, which is enough to allow the plate 10 to be permanently fixed to the staff 20 during conventional operation of the timepiece and the knocks that the timepiece is liable to experience.

In the case of the first embodiment, with a view to simplifying FIG. 4, the elements 30 and 40 have not been depicted. Preferably, these elements are assembled on the first component 10 before the latter is assembled on the staff 20. Thus, the pivot 23*a* does not experience the forces induced by the assembling of the elements 30 and 40 on the first component 10. Alternatively, the mounting of the first component 10 on the second component 20 can be performed upstream.

Advantageously, such an assembly method does not subject the balance staff to axial or substantially axial forces that could prove excessive for a staff in the horological size bracket, particularly if these forces are intended to be absorbed by a balance staff pivot, the dimensions of which are very appreciably smaller than those of the body of the staff. Furthermore, such an assembly method does not require a staff made of a material that has a plastic domain. In this regard, such an assembly method constitutes a particularly advantageous alternative to the traditional methods of assembling a component on a staff by driving it on or riveting it thereto.

Whatever the embodiment, the at least one plastically deformable portion is made from a material that has a plastic deformation domain. As a preference, this at least one portion consists of a portion of which the geometry and/or the material allows the creation of a region of lower mechanical strength. This lower mechanical strength makes it possible to limit the mechanical force that needs to be exerted on the portion during the plastic deformation of the portion.

Whatever the embodiment, the second component preferably comprises a surface 24; 24'; 24" for guidance of the first component relative to the second component. This surface is preferably a cylinder of revolution or one or more portions of a cylinder of revolution. This surface therefore allows the first component to be positioned relative to the second component, at least relative to certain directions. This surface preferably collaborates with the opening of the first component for performing this function.

Whatever the embodiment, the second component preferably comprises a surface 24; 24'; 24" for attachment of the first component to the second component. During the plastic deformation of the first component there is formed, in the opening, a boss, notably a bulge of material which comes to bear against the fixing surface of the second component. Even after the application of the action of deforming the first component, the boss remains in contact against the fixing surface of the second component because of the plastic nature of the deformation of the first component. Because of the friction at the fixing surface at the interface between the first component and the second component and/or because of an obstacle at the fixing surface, tangential loads relative to the axes A1; A1'; A1" or A2; A2'; A2" may be transmitted from one component to the other. Furthermore, because of the friction at the fixing surface 24; 24'; 24" at the interface between the first component and the second component and/or because of the obstacle at the fixing surface, axial forces relative to the axes A1; A1'; A1" or A2; A2'; A2" can be transmitted from one component to the other. Thus, the first and second components are fixed to one another, and more particularly, are permanently fixed.

Advantageously, the guide surface 24; 24'; 24" is a surface of revolution and/or the fixing surface 24; 24'; 24" is a surface of revolution.

Whatever the embodiment, the axes A1; A1'; A1" and A2; A2'; A2" are advantageously coincident once the first component has been assembled on the second component, notably fixed to the second component.

Whatever the embodiment, the plastic deformation is advantageously performed in a plane perpendicular to the axes A1; A1'; A1" and A2; A2'; A2". Thus, the mechanical actions applied to bring about the deformation are mainly and/or substantially applied in directions contained in this plane. The result of this is that the material is chiefly deformed in these directions and that the height of the bump or of the bumps is determined in these directions.

Whatever the embodiment, the second component may be a staff 20; 20'; 20" and/or the element for guidance and/or for attachment of the horology device may comprise one or more pivots 23*a*, 23*b*; 23*a*', 23*b*'; 23*a*", 23*b*", particularly one or more pivots of a diameter smaller than 0.1 mm, or even smaller than 0.08 mm, notably in the case of the first embodiment.

Whatever the embodiment
the second component may be made from a material that does not have a plastic deformation domain and/or the second component is made of a ceramic, notably:
  a zirconia, particularly an yttrium-doped zirconia, notably a 3% (by weight) yttrium-doped zirconia, or
  a monocrystalline alumina, or
  an alumina-zirconia combination,
and/or
the second component may have a hardness greater than 1000 Hv or even greater than 1100 Hv, and/or the second component may have a Vickers hardness 2 to 6 times higher than that of the first component.

The material of the second component 20; 20'; 20" is preferably chosen so that the step of plastic deformation of a portion 12*a*, 12*b*; 12*a'*, 12*b'*; 12*a"* of the first component 10, 10', 10" does not invalidate the geometric integrity of the second component. Advantageously, the material of the second component may be chosen so that a step of heat treatment of the first component does not invalidate either the properties of the geometric integrity of the second component.

Because of the intrinsic properties of ceramics which are extremely hard (Vickers hardnesses greater than 1000 Hv or comprised between 1100 Hv and 1600 Hv), the second component 20 does not experience any alteration during the step of plastic deformation of a portion of the first component. Furthermore, such a material is particularly advantageous for a staff function, notably a balance staff function. This is because the staff may advantageously comprise pivots 23*a*, 23*b* at its ends, which pivots are intended to collaborate, notably to collaborate through contact, with bearings of the horology movement. These pivots may have a diameter d23 different from the diameter d20 of the body or of the surface 24 of the staff 20, less than 0.1 mm, or even less than 0.08 mm. Because of the intrinsic properties of the ceramics mentioned hereinabove, the pivots do not become marked during knocks, and the chronometric performance of an oscillator of the balance wheel/hairspring type comprising a balance wheel according to the invention is lastingly maintained. Advantageously, in the event of a significant knock, these pivots do not deform, unlike steel pivots which may bend and therefore adversely affect the chronometry of the horology movement. Furthermore, ceramics offer the additional advantage of being particularly insensitive to magnetic fields, and of not influencing the running of the timepiece when subjected to a magnetic field, notably a magnetic field stronger than 80 kA/m (1000 G).

Whatever the embodiment, the second component, particularly the surface 24; 24'; 24", may comprise at least one recessed portion 22*a*, 22*b*; 22*a'*, 22*b'*; 22*a"*, notably a groove extending all the way around the second component or extending partially around the second component, particularly a groove having a U-shaped or V-shaped or rectangular cross section, the at least one recessed portion receiving at least part of the at least one deformed portion 12*a*, 12*b*; 12*a'*, 12*b'*; 12*a"* of the first component.

Whatever the embodiment, the at least one plastically deformable portion may have a first wall thickness e12 smaller than a second wall thickness e13 of at least one other portion of the first component or of the remainder of the first component, for example the first thickness is less than half the second thickness and/or the first thickness is less than 0.2 mm, or even less than 0.15 mm, or even less than 0.12 mm.

Whatever the embodiment, the torque resistance of the first component on the second component about the axis A2; A2'; A2" may be greater than 3 mN·m, or even greater than 5 mN·m.

Whatever the embodiment, the opening 11; 11'; 11" may be a through-opening, namely may pass all the way through the first component. Alternatively, this opening may not pass all the way through.

Whatever the embodiment, the material of the first component is advantageously chosen so that it can be plastically deformed. The material of the first component 10, 10', 10" is, for example, a copper-containing alloy such as a CuBe2 alloy or a CuNiSn alloy such as a CuNi15Sn8 or "Tough-Met" alloy. The material of the first component 10, 10', 10" may also be a lead-free seal such as a Finemac steel.

In the embodiments described, the second component 20; 20'; 20" is a staff guiding rotation with the aid of the guide element 23*a*, 23*b*; 23*a'*, 23*b'*; 23*a"* of the first component which is attached and fixed to the second component. To complement this, in the third embodiment described, the second component is also a translational guidance staff using the guide element 23*b"* of the first component which is attached and fixed to the 15 second component. Alternatively, in another embodiment, the second component could simply be a staff providing translational guidance of the first component which is attached and fixed to the second component.

Alternatively still, the second component may comprise a fixing element, particularly a fixing surface, for fixing the horology device. For example, the second component could be designed to be fixed, via the fixing element or surface, to a movement, notably to a movement blank. In such an embodiment, the horology device could be completely fixed with respect to a frame of the movement.

Whatever the embodiment, the first component may at least partially jacket or cover the second component over almost the entirety of its length measured along the axes A1, A1', A1" or A2, A2', A2". For example, the first component may jacket or cover the second component over the entirety of its length with the exception of the pivots, and possibly with the exception of the pivot shanks. Alternatively, the first component may jacket or cover a smaller portion of the second component. As a preference, the first component may jacket or cover a portion representing at least 50%, or even at least 70%, of the length of the second component.

The invention also relates to a first component as such, intended for the creation of a horology device according to the invention.

The invention further relates to a second component as such, intended for the production of a horology device according to the invention.

Throughout this document, what is meant by "permanently fixed" or "permanently attached" is a fixing that provides torque resistance of the first component on the second component that prevents any shifting of the first component relative to the second component during normal operation of the timepiece. For example, the torque resistance is greater than 3 mN·m, or even greater than 5 mN·m.

Throughout this document "plastic deformation" means, indiscriminately, the action or the result of such an action.

The invention claimed is:

1. A horology device comprising:
    a first component comprising at least one plastically deformable portion, and
    a second component provided with a surface, wherein the surface is a surface of revolution and/or of guidance and/or of attachment of the first component relative to the second component,
    the first component being fixed permanently to the second component by plastic deformation of the at least one plastically deformable portion against the second component, in a plane perpendicular or substantially perpendicular to an axis of said surface of the second component,
    wherein the first component including the at least one plastically deformable portion is integrally formed as a single piece of a uniform material,
    wherein the surface of the second component comprises at least one recessed portion, the at least one recessed portion accepting at least in part the at least one plastically deformable portion of the first component, and wherein the recessed portion extends in revolution around the axis of the second component.

2. The horology device of claim 1, wherein the second component is a staff and/or wherein the second component comprises an element for guidance and/or for fixing of the horology device.

3. The horology device of claim 1, wherein the second component is made from a material that does not have a plastic deformation domain and/or wherein the second component is made of ceramic, wherein the ceramic is:

a zirconia, particularly an yttrium-doped zirconia, notably a 3% yttrium-doped zirconia, or a monocrystalline alumina, or an alumina-zirconia combination, and/or wherein the second component has a hardness greater than 1000 Hv, or the second component has a Vickers hardness 2 to 6 times higher than that of the first component.

4. The horology device of claim 1, wherein the at least one plastically deformable portion has a first wall thickness smaller than a second wall thickness of at least one other portion of the first component.

5. The horology device of claim 1, wherein the first component is a balance wheel plate at least partially jacketing or covering the second component.

6. The horology device of claim 1, comprising a portion in the plane for accepting a flywheel and/or a portion for accepting a collet of a hairspring and/or a portion forming a disk comprising a pin.

7. The horology device of claim 1, wherein the first component is a pinion at least partially jacketing or covering the second component.

8. The horology device of claim 7, wherein the pinion comprises a portion accepting a gearwheel.

9. The horology device of claim 1, wherein a torque resistance of the first component on the second component about the axis is greater than 3 mN.m, or even greater than 5 mN.m.

10. A method for producing a horology device of claim 1, comprising the following steps:

a step of supplying the first component comprising the at least one plastically deformable portion, a step of supplying the second component provided with the surface, wherein the surface is the surface of revolution and/or the surface of guidance and/or of attachment of the first component relative to the second component, a step of positioning the first component relative to the second component, a step of fixing the first component to the second component by plastic deformation of the at least one plastically deformable portion of the first component against the second component, in the plane perpendicular or substantially perpendicular to the axis of said surface of the second component.

11. The method of claim 10, wherein the fixing step comprises the use of at least one set of pliers to plastically deform the at least one portion and/or wherein the fixing step comprises the simultaneous plastic deformation of several deformable portions.

12. A horology device obtained by the method of claim 10.

13. A horology movement, comprising the horology device of claim 1, the horology device being mounted with the ability to rotate and/or to translate relative to a frame of the movement or being fixed to the frame of the movement.

14. A timepiece, comprising the horology device of claim 1.

15. A timepiece comprising the horology movement of claim 13.

16. The method of claim 10, wherein the surface includes an element for guidance and/or attachment of the horology device.

17. A horology device obtained by the method of claim 11.

18. The horology device of claim 2, wherein the second component is one or more pivots.

19. The horology device of claim 18, wherein the second component is one or more pivots of a diameter smaller than 0.1 mm.

20. The horology device of claim 1, wherein the at least one recessed portion is a groove extending all the way around the second component or extending part of the way around the second component.

21. The horology device of claim 1, wherein the at least one recessed portion is a groove having a U-shaped or V-shaped or rectangular cross section.

22. The horology device of claim 4, wherein the first wall thickness is less than half the second wall thickness and/or the first wall thickness is less than 0.2 mm.

* * * * *